United States Patent
Yahiro

(10) Patent No.: US 9,039,505 B2
(45) Date of Patent: May 26, 2015

(54) GAME DEVICE, METHOD FOR CONTROLLING GAME DEVICE, AND INFORMATION STORAGE MEDIUM

(75) Inventor: Yuta Yahiro, Machida (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 128 days.

(21) Appl. No.: 13/879,771

(22) PCT Filed: Apr. 27, 2012

(86) PCT No.: PCT/JP2012/061441
§ 371 (c)(1),
(2), (4) Date: Apr. 16, 2013

(87) PCT Pub. No.: WO2012/172877
PCT Pub. Date: Dec. 20, 2012

(65) Prior Publication Data
US 2013/0244794 A1    Sep. 19, 2013

(30) Foreign Application Priority Data

Jun. 14, 2011    (JP) .................. 2011-132656

(51) Int. Cl.
*A63F 13/00*    (2014.01)
*A63F 9/24*    (2006.01)
*A63F 13/40*    (2014.01)

(52) U.S. Cl.
CPC ......... *A63F 13/10* (2013.01); *A63F 2300/6027* (2013.01); *A63F 2300/634* (2013.01); *A63F 2300/8011* (2013.01)

(58) Field of Classification Search
None
See application file for complete search history.

(56) References Cited

U.S. PATENT DOCUMENTS

| 2006/0246973 A1* | 11/2006 | Thomas et al. .................. 463/4 |
| 2009/0011831 A1* | 1/2009 | Yamada .......................... 463/37 |
| 2009/0036220 A1* | 2/2009 | Nagashima ..................... 463/43 |
| 2010/0248830 A1 | 9/2010 | Otomo et al. |
| 2011/0098114 A1 | 4/2011 | Ishida |
| 2013/0210531 A1* | 8/2013 | Ivanov et al. .................. 463/43 |

FOREIGN PATENT DOCUMENTS

| JP | 2009-134394 A | 6/2009 |
| JP | 2010-233734 A | 10/2010 |
| JP | 2011-087869 A | 5/2011 |

* cited by examiner

*Primary Examiner* — Dmitry Suhol
*Assistant Examiner* — Jason Yen
(74) *Attorney, Agent, or Firm* — Sughrue Mion, PLLC

(57) ABSTRACT

Action history writing means (92) of a game device (10) writes, into storing means (80), in a game being executed, action history data indicative of an action history performed by a specified character (62) among a plurality of characters (62). Action history condition determination means (94) determines, in the game being executed, based on the action history data, whether or not any one of a combination of a current action of the specified character (62) and one or more previous actions of the specified character (62) and a combination of a plurality of actions of the specified character (62) satisfies an action history condition. In a case where it is determined that the action history condition is satisfied, action control means (96) causes a character (62) to act based on action information associated with the action history condition.

10 Claims, 7 Drawing Sheets

| ACTION HISTORY CONDITION | SELECTION CONDITION | ACTION INFORMATION |
|---|---|---|
| DRIBBLING BALL TOWARD TOUCHLINE<br>↓<br>DRIBBLING BALL TO GOAL ASSOCIATED WITH OPPONENT TEAM<br>↓<br>DRIBBLING BALL TOWARD TOUCHLINE | MIDFIELDER OR FORWARD | SIDE ATTACK |
| DRIBBLING BALL TOWARD TOUCHLINE<br>↓<br>STOP<br>↓<br>DRIBBLING BALL TOWARD THE OTHER TOUCHLINE | CHARACTER NEAR BALL | GO TO GET A PASS |
| ⋮ | ⋮ | ⋮ |

FIG.5

| ACTION HISTORY DATA ||
|---|---|
| ACTION NUMBER | ACTION IDENTIFICATION INFORMATION |
| 1 | DRIBBLING BALL TOWARD TOUCHLINE |
| 2 | DRIBBLING BALL TO GOAL ASSOCIATED WITH OPPONENT TEAM |
| 3 | DRIBBLING BALL TOWARD TOUCHLINE |
| 4 | STOP |
| ⋮ | ⋮ |

FIG.6

| ACTION HISTORY CONDITION | ACTION INFORMATION |
|---|---|
| DRIBBLING BALL TOWARD TOUCHLINE ↓ DRIBBLING BALL TO GOAL ASSOCIATED WITH OPPONENT TEAM ↓ DRIBBLING BALL TOWARD TOUCHLINE | SIDE ATTACK |
| DRIBBLING BALL TOWARD TOUCHLINE ↓ STOP ↓ DRIBBLING BALL TOWARD OTHER TOUCHLINE | GO TO GET A PASS |
| ⋮ | ⋮ |

| CONDITION | ACTION TYPES |
|---|---|
| DRIBBLING BALL TOWARD TOUCHLINE FOR 2 SECONDS | DRIBBLING BALL TOWARD TOUCHLINE |
| DRIBBLING BALL TO GOAL ASSOCIATED WITH OPPONENT TEAM FOR 1 SECOND | DRIBBLING BALL TO GOAL ASSOCIATED WITH OPPONENT TEAM |
| POSITION CHANGING IS EQUAL TO OR LESS THAN CRITERION VALUE | STOP |
| ⋮ | ⋮ |

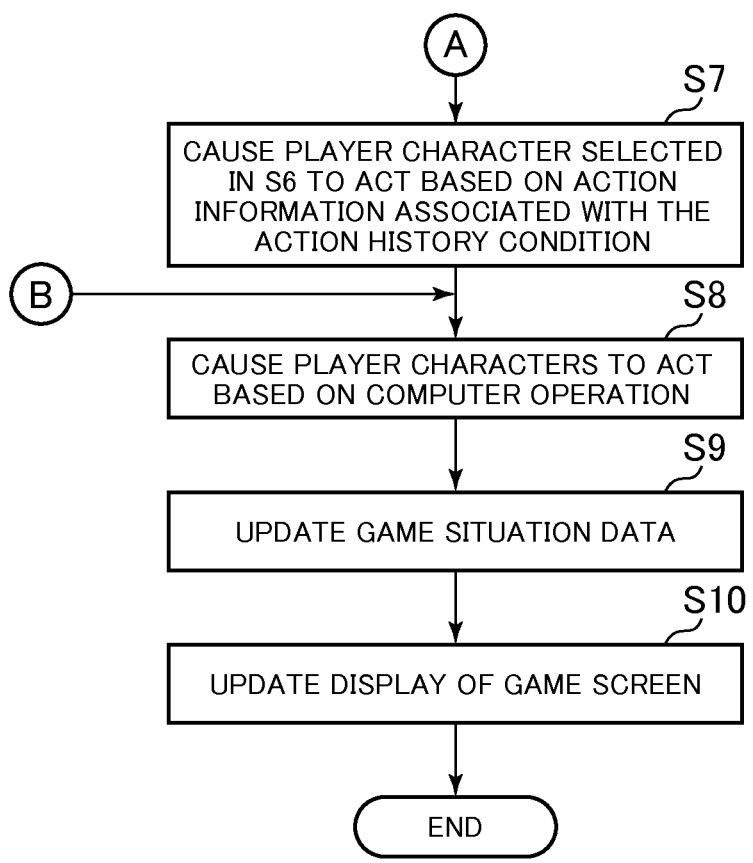

FIG.11

| ACTION HISTORY CONDITION | SELECTION CONDITION | ACTION INFORMATION |
|---|---|---|
| DRIBBLING BALL TOWARD TOUCHLINE<br>↓<br>DRIBBLING BALL TO GOAL ASSOCIATED WITH OPPONENT TEAM<br>↓<br>DRIBBLING BALL TOWARD TOUCHLINE | MIDFIELDER<br>OR<br>FORWARD | SIDE ATTACK |
| DRIBBLING BALL TOWARD TOUCHLINE<br>↓<br>STOP<br>↓<br>DRIBBLING BALL TOWARD THE OTHER TOUCHLINE | CHARACTER NEAR BALL | GO TO GET A PASS |
| ⋮ | ⋮ | ⋮ |

GAME DEVICE, METHOD FOR CONTROLLING GAME DEVICE, AND INFORMATION STORAGE MEDIUM

TECHNICAL FIELD

The present invention relates to a game device, a method for controlling the game device, a program, and an information storage medium.

BACKGROUND ART

There has been known a game device for executing a game where a plurality of game characters respectively perform an action. In this game, some game characters that are not a user's operation target are controlled based on a computer operation (see e.g., Patent Document 1).

CITATION LIST

Patent Literature

Patent Literature 1: JP2010-233734A

SUMMARY OF INVENTION

Technical Problem

However, in conventional technology, attention is only focused on a motion of a specified character at one point in time (e.g., present time) so as to control motions of other characters. As a result, it is not possible to fully improve the controllability of motions of the characters.

For example, Patent Document 1 describes a soccer game in which, when a specified character dribbles a ball, other characters perform actions that are determined on the basis of the direction of the dribbling. In other words, in Patent Document 1, while the specified character is dribbling the ball, the other characters perform actions that are determined on the basis of the direction of the dribbling, regardless of an action performed before the dribbling by the specified character.

For example, the other characters may act differently between a case where the specified character continued to dribble the ball toward a touchline before the dribbling mentioned above and a case where the specified character continued to dribble the ball in the same direction before the dribbling mentioned above. For example, in the former case, the other characters would need to perform a side attack. In the latter case, the other characters would need to prepare for a case where the specified character that dribbles the ball is dispossessed of the ball.

In this regard, in conventional technology, when the specified character is e.g., dribbling a ball, the other characters could only either perform a side attack or prepare for a case where the ball is taken away. In conventional technology, motions of characters have not been sufficiently controlled, and thus sometimes users are not satisfied with the controllability of the motions of the characters.

One or more embodiments of the present invention have been conceived in view of the above, and an object thereof is to provide a game device, a method for controlling the game device, a program, and an information storage medium capable of improving controllability of a motion of a character operated by a computer.

Solution to Problem

In order to solve the above described problems, a game device according to the present invention executes a game in which each of a plurality of characters acts and includes action history writing means for writing, into storage means, in the game being executed, action history data indicative of a history of actions performed by a specified character among the plurality of characters, obtaining means for obtaining action information regarding an action that should be performed by a character, among the plurality of characters other than the specified character, from storage means for storing the action information and an action history condition regarding any one of a combination of a current action of the specified character and one or more previous actions of the specified character and a combination of a plurality of previous actions of the specified character, the action history condition and the action information being stored in association with each other, action history condition determination means for determining, in the game being executed, based on the action history data, whether or not any one of the combination of the current action of the specified character and one or more previous actions of the specified character and the combination of the plurality of previous actions of the specified character satisfy the action history condition, and action control means for causing, in the game being executed, in a case where it is determined that the action history condition is satisfied, the character, among the plurality of characters other than the specified character, to act based on the action information associated with the action history condition.

A method according to the present invention for controlling a game device for executing a game in which each of a plurality of characters acts includes the steps of writing, into storage means, in the game being executed, action history data indicative of a history of actions performed by a specified character among the plurality of characters, obtaining action information regarding an action that should be performed by a character, among the plurality of characters other than the specified character, from storage means for storing the action information and an action history condition regarding any one of a combination of a current action of the specified character and one or more previous actions of the specified character and a combination of a plurality of previous actions of the specified character, the action history condition and the action information being stored in association with each other, determining, in the game being executed, based on the action history data, whether or not anyone of the combination of the current action of the specified character and one or more previous actions of the specified character, or the combination of the plurality of previous actions of the specified character, satisfy the action history condition, and causing, in the game being executed, in a case where it is determined that the action history condition is satisfied, the character, among the plurality of characters other than the specified character, to act based on the action information associated with the action history condition.

A program according to the present invention causes a computer to function as a game device for executing a game in which each of a plurality of characters acts. The program further causes the computer to function as action history writing means for writing, into storage means, in the game being executed, action history data indicative of a history of actions performed by a specified character among the plurality of characters, obtaining means for obtaining an action information regarding an action that should be performed by a character, among the plurality of characters other than the specified character, from storage means for storing the action information and an action history condition regarding any one of a combination of a current action of the specified character and one or more previous actions of the specified character and a combination of a plurality of previous actions of the specified character, the action history condition and the action information being stored in association with each other, action history condition determination means for determining, in the game being executed, based on the action history data, whether or not any one of the combination of the current action of the specified character and one or more previous actions of the specified character and combination of the plurality of previous actions of the specified character satisfy the action history condition, and action control means for causing, in the game being executed, in a case where it is determined that the action history condition is satisfied, the character, among the plurality of characters other than the specified character, to act based on the action information associated with the action history condition.

A non-transitory computer readable information storage medium according to the present invention is a computer readable information storage medium for storing the program mentioned above.

According to the present invention, it is possible to improve controllability of a motion of a character operated by the computer.

In an aspect of the present invention, the action history data indicates a history of actions performed by a user's operation target among the plurality of characters. The action history condition is a condition relating to any one of a combination of a current action of the user's operation target and one or more previous actions of the user's operation target and a combination of a plurality of previous actions of the user's operation target. The action history condition determination means determines, in the game being executed, based on the action history data, whether or not any one of the combination of the current action of the user's operation target and one or more previous actions of the user's operation target and the combination of the plurality of previous actions of the user's operation target satisfies the action history condition.

In an aspect of the present invention, the game device executes a game using a moving object. The action history data indicates a history of actions performed by, among the plurality of characters, the character in possession of the moving object. The action history condition is a condition relating to any one of a combination of a current action of the character in possession of the moving object and one or more previous actions of the character in possession of the moving object and a combination of a plurality of previous actions of the character in possession of the moving object. The action history condition determination means determines, in the game being executed, based on the action history data, whether or not any one of the combination of the current action of the character in possession of the moving object and one or more previous actions of the character in possession of the moving object and the combination of the plurality of previous actions of the character in possession of the moving object satisfies the action history condition.

In an aspect of the present invention, the action control means includes selecting means for selecting, among the plurality of characters other than the specified character, a character that satisfies a selection condition relating to a position, and causes the character selected by the selecting means to act based on the action information associated with the action history condition.

In an aspect of the present invention, each of the plurality of characters has a role in the game. The action control means includes selecting means for selecting, among the plurality of characters other than the specified character, a character that satisfies a selection condition relating to a role in the game, and causes the character selected by the selecting means to act based on the action information associated with the action history condition.

In an aspect of the present invention, the action control means includes means for obtaining, from means for storing a game parameter in association with a combination of the plurality of characters, the game parameter, and selecting means for selecting, among the plurality of characters other than the specified character, a character that satisfies a selection condition relating to the game parameter associated with a combination with this character and the specified character. The action control means causes the character selected by the selecting means to act based on the action information associated with the action history condition.

In an aspect of the present invention, the action information is stored in association with the action history condition and the selection condition. The selecting means determines, in the game being executed, in a case where it is determined that the action history condition is satisfied, whether or not the selection condition associated with the action history condition is satisfied. The action control means causes the character selected by the selecting means to act based on the action information associated with the action history condition and the selection condition.

BRIEF DESCRIPTION OF DRAWINGS

[FIG. 5] A diagram showing an example of data storage of action history data.

[FIG. 6] A diagram showing an example of an association between an action history condition and action information.

[FIG. 9] A flow chart illustrating processing that the game device executes.

[FIG. 10] A diagram showing an example of data storage of game parameters.

[FIG. 11] A diagram showing an example of data storage of action information of the modification (4).

DESCRIPTION OF EMBODIMENTS

[1. Embodiment]

In the following, an example embodiment of the present invention will be described in detail with reference to the accompanying drawings. The game device according to the embodiment of the present invention is implemented by, for example, a consumer game machine (stationary game machine), portable game machine, mobile phone, personal digital assistant (PDA) or personal computer. In this example, the case of implementing the game device according to the embodiment by the consumer game machine will be described.

[1-1. Hardware Structure of Game Device]

Figure 1:
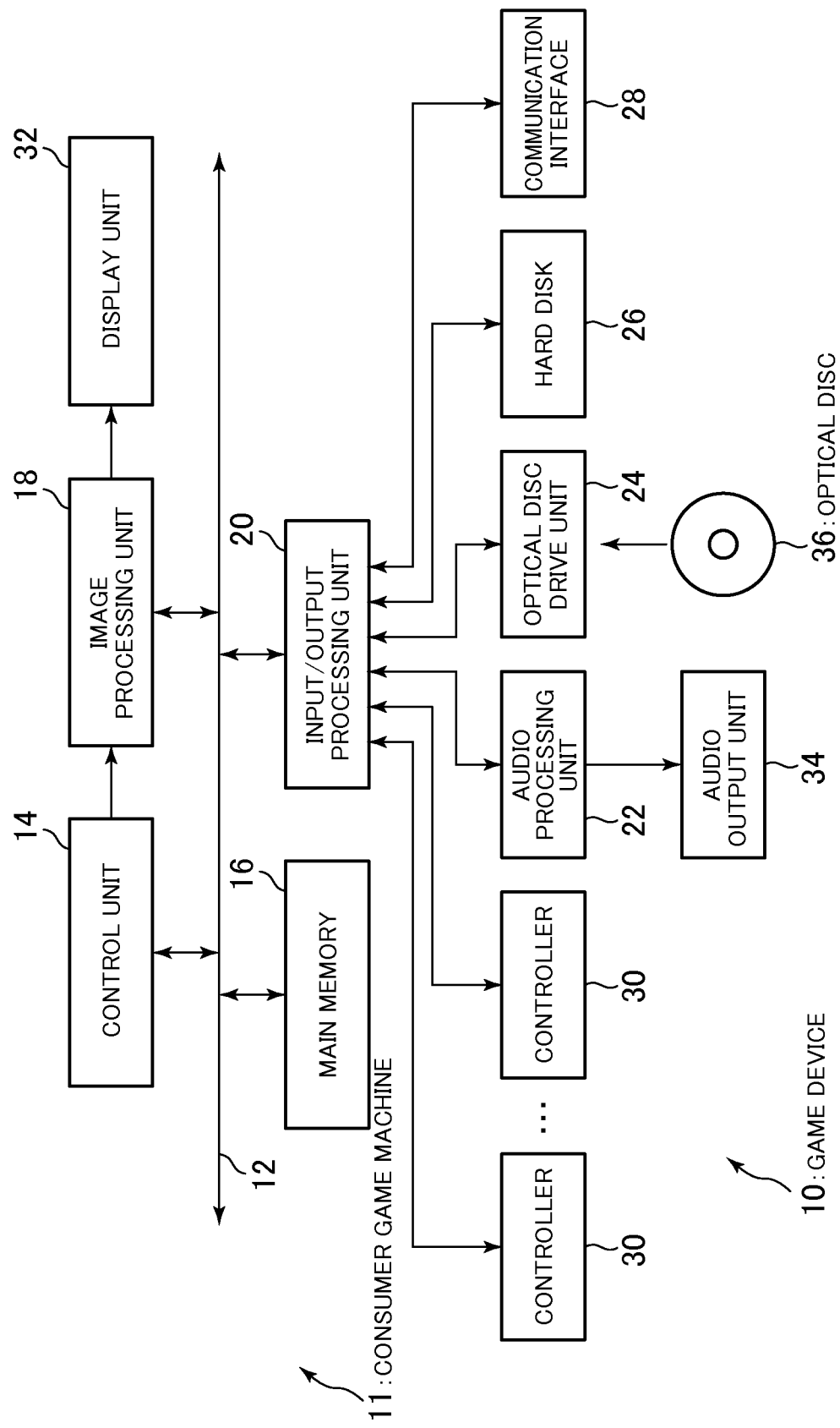
[FIG. 1] A diagram showing a hardware structure of a game device according to an embodiment of the present invention.

FIG. 1 illustrates a hardware structure of the game device according to the embodiment of the present invention. The game device 10 shown in FIG. 1 includes a consumer game machine 11, a display unit 32, an audio output unit 34, and an optical disc 36 (information storage medium).

The display unit 32 and the audio output unit 34 are connected to the consumer game machine 11. The display unit 32 is, for example, a consumer television set or a liquid crystal display. The audio output unit 34 is, for example, speakers or headphones embedded in the consumer television set.

The consumer game machine 11 is a known computer game system. The consumer game machine 11 includes a bus 12, a control unit 14, a main memory 16, an image processing unit 18, an input/output processing unit 20, an audio processing unit 22, an optical disc reproducing unit 24, a hard disk 26, a communication interface 28, and a controller 30.

The control unit 14 includes one or more control units (e.g., CPU). The control unit 14 executes processing or information processing for controlling the portions of the consumer game machine 11 based on an operating system stored in a ROM (not shown) or a program read out from the optical disc 36.

The main memory 16 includes, for example, a RAM. The program or data read out from the optical disc 36 is written into the main memory 16. The main memory 16 is used as a working memory of the control unit 14. The bus 12 functions to exchange address or data between the portions of the consumer game machine 11.

The image processing unit 18 includes a VRAM. The image processing unit 18 draws a game screen on the VRAM based on image data supplied from the control unit 14. The game screen drawn on the VRAM is converted into a video signal and output to the display unit 32 at a predetermined time.

The input/output processing unit 20 is an interface for allowing the control unit 14 to access the audio processing unit 22, optical disc reproducing unit 24, hard disk 26, communication interface 28 and controller 30.

The audio processing unit 22 includes a sound buffer. The audio processing unit 22 outputs audio data, which is read out from the optical disc 36 to the sound buffer, from the audio output unit 34.

The communication interface 28 is an interface for connecting the consumer game machine 11 to a communication network, such as the Internet, via a wired or wireless connection.

The optical disc reproducing unit 24 reads a program or data stored in the optical disc 36. While this embodiment explains a case of using the optical disc 36 so as to provide the consumer game machine 11 with a program or data, other information storage media, such as a memory card, may be used to provide the consumer game machine 11 with a program or data. Alternatively, for example, a program or data may be provided to the consumer game machine 11 from remote places via a communication network.

The hard disk 26 is a conventional hard disk device (auxiliary storage device). In this embodiment, the program or data to be stored in the optical disc 36 may be also stored in the hard disk 26.

The controller 30 is a general operation means for receiving a user's various game operations. One or more controllers 30 are connected to the consumer game machine 11 in a wired or wireless manner. The input/output processing unit 20 scans a state of each of operating members of the controller 30 at predetermined intervals (e.g., every $1/60^{th}$ of a second). An operation signal indicative of the scanning result is fed into the control unit 14 via the bus 12. The control unit 14 determines a game operation of the user based on the operation signal.

[1-2. Game Executed in Game Device]

The game device 10 executes a game where, for example, a plurality of game characters act (move) by running a game program read out from the optical disc 36. The following explains a case of executing a soccer game to play a soccer match in which the game characters move around in the game space representing a soccer field.

In this soccer game, a match is played between a team operated by a user (hereinafter "user team") and a team operated by an opponent (computer or another user) (hereinafter "opponent team"). When the soccer game begins, for example, the game space is constructed in the main memory 16.

Figure 2:
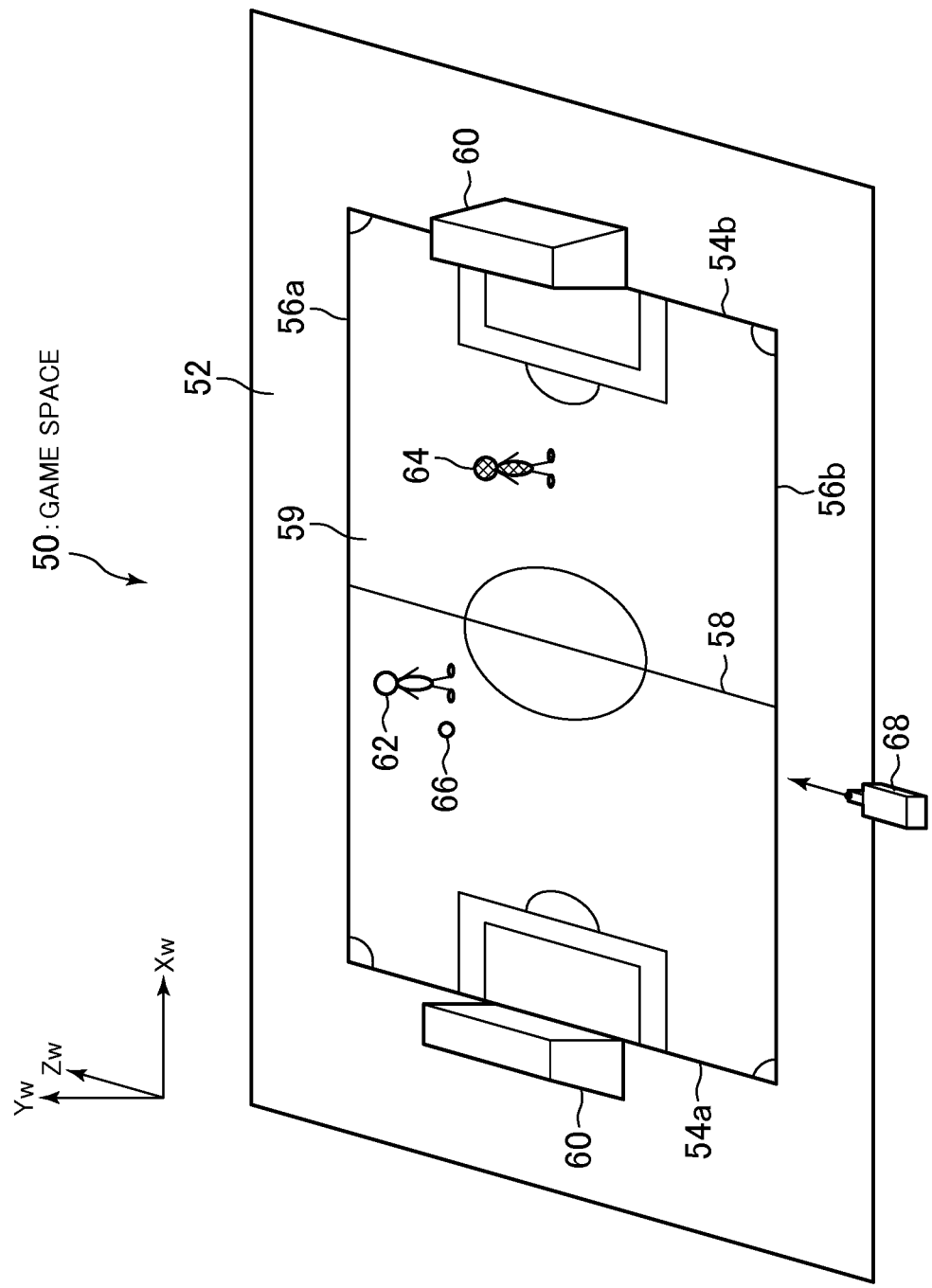
[FIG. 2] A diagram showing an example of a game space.

FIG. 2 illustrates an example of the game space. The game space 50 illustrated in FIG. 2 is a virtual three-dimensional space in which three coordinate axes (Xw-axis, Yw-axis, and Zw-axis) are orthogonal to one another. As shown in FIG. 2, a field 52, which is an object representing a soccer field, is placed in the game space 50.

The field 52 has two goal lines 54a and 54b, two touchlines 56a and 56b, and a center line 58. The match is played on a pitch 59, which is enclosed by two goal lines 54a and 54b and two touchlines 56a and 56b, and areas around the pitch 59 (given areas other than the pitch 59 in contact with goal lines 54a and 54b or touchlines 56a and 56b).

On the field 52, there are arranged objects including goals 60 representing soccer goals, a player character 62 representing a soccer player belonging to the user team, a player character 64 representing a soccer player belonging to the opponent team, and a ball 66 representing a soccer ball (moving object). A position of each object is specified by, for example, a three-dimensional coordinate of a world coordinate system (Xw-Yw-Zw coordinate system).

On the field 52, there are arranged eleven player characters 62 of the user team and eleven player characters 64 of the opponent team, which have been omitted from FIG. 2.

When the player character 62 (64) and the ball 66 move towards each other, the player character 62 (64) and ball 66 are associated with each other under the predetermined conditions. In this case, a moving action of the player character 62 (64) is dribbling. In the following, the state in which the player character 62 (64) is associated with the ball 66 is described as "the player character 62 (64) in possession of the ball 66."

A virtual camera 68 (point of view) is set up in the game space 50. The display unit 32 displays the game space 50 viewed from the virtual camera 68 on the game screen. The game screen is generated by coordinate-transforming vertex coordinates of respective objects placed on the game space 50 from the world coordinate system into the screen coordinate system using the predetermined coordinate transformation calculation.

Figure 3:
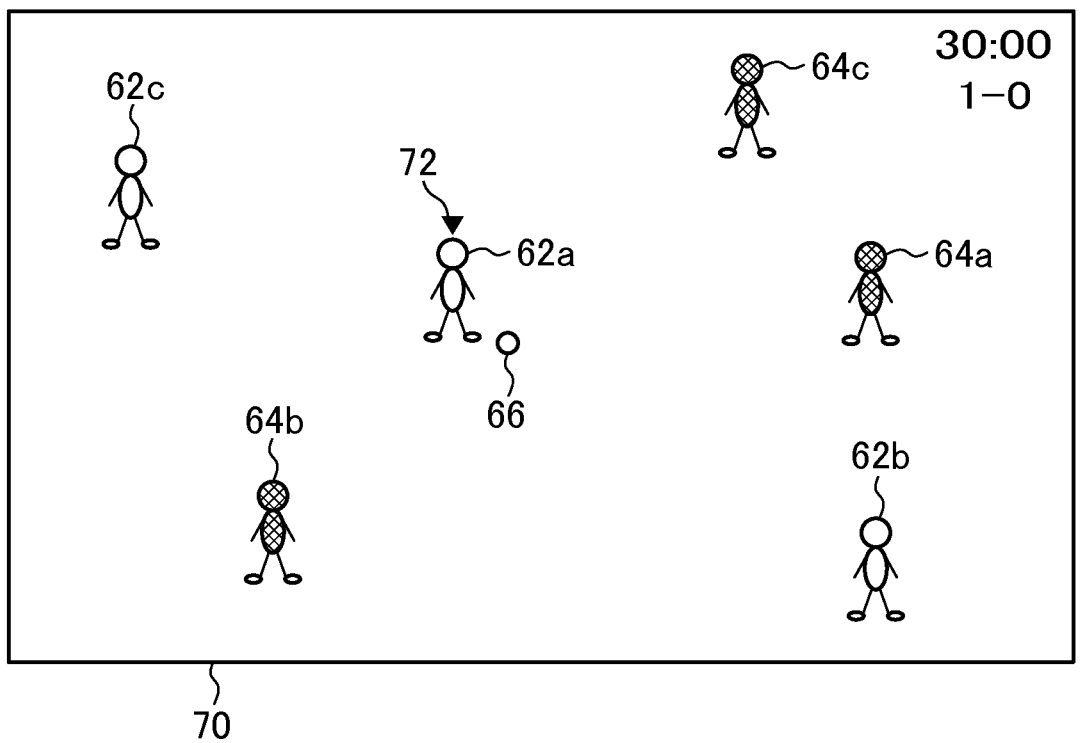
[FIG. 3] A diagram showing an example of a game screen displayed on a display unit.

FIG. 3 illustrates an example of the game screen displayed on the display unit 32. The game screen 70 shown in FIG. 3 includes three player characters 62a, 62b, and 62c belonging to the user team, three player characters 64a, 64b, and 64c belonging to the opponent team, and the ball 66.

For example, one of the player characters 62 belonging to the user team acts in accordance with the user's operation. In a state shown in FIG. 3, for example, the player character 62a in possession of the ball 66 is specified as a target of the user's operation. A cursor 72 is displayed above the head of the player character 62a to indicate that the player character 62a is the user's operation target.

For example, the user moves the player character 62a, which is the operation target, using a controller 30 to designate a direction. For example, when the player character 62a is in possession of the ball 66, the user instructs the player character 62a as to a direction in which to dribble or kick the ball 66 using the controller 30.

The player characters 62 (64) that are placed in the game space and are not included in the user's operation target act autonomously in accordance with the predetermined behavior algorithm. For example, the player characters 62 other than the player character 62a (e.g., player characters 62b and 62c) act in accordance with the computer operation.

This embodiment explains a case where, when a user's operation target is in possession of the ball 66, other player characters 62 (i.e., off-the-ball soccer players) act based on a history of recent actions of the user's operation target (i.e., soccer player in possession of the ball). For example, in a situation shown in FIG. 3, the player characters 62b and 62c act based on a history of recent actions of the player character 62a, which is the user's operation target, thereby improving the controllability of the player characters 62b and 62c.

For example, in a situation shown in FIG. 3, suppose that the user's operation target dribbles a ball toward a goal 60 that is associated with the opponent. In this embodiment, the player characters 62b and 62c act differently between a case where the user's operation target continues to dribble the ball toward the goal for a predetermined period of time and a case where the user's operation target dribbles the ball while changing directions of the ball, thereby improving the controllability of the player characters 62. In the following, this technology will be explained in detail.

[1-3. Functions Implemented in Game Device]

Figure 4:
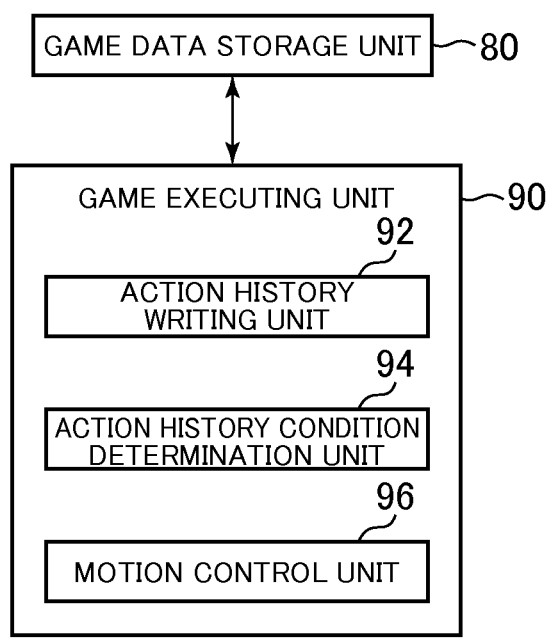
[FIG. 4] A functional block diagram showing functions implemented in the game device and related to the present invention.

FIG. 4 is a functional block diagram showing functions implemented in the game device 10 and related to the present invention. As shown in FIG. 4, the game device 10 implements a game data storage unit 80 and a game executing unit 90 by executing a game program.

[1-3-1. Game Data Storage Unit]

The game data storage unit 80 is mainly constructed by, for example, a main memory 16 and an optical disc 36. The game data storage unit 80 stores, for example, data necessary for performing a soccer game. This embodiment explains a case where the game data storage unit 80 stores (i) game situation data, (ii) action history data, and (iii) action information.

[Game Situation Data]

The game data storage unit 80 stores, for example, game situation data that indicates a current situation of the soccer game. For example, the game situation data includes following data:

(1) data indicative of the current situation (e.g., position, posture, destination, and moving speed) of each of the player characters 62 (64)
(2) data indicative of the player character 62 that is set as the user's operation target
(3) data indicative of the current situation (e.g., position, destination and moving speed) of the ball 66
(3) data indicative of the player character 62 (64) in possession of the ball 66
(4) other data indicative of the current situation of the match (e.g., scores of both teams and elapsed time)

[Action History Data]

For example, the game data storage unit 80 stores action history data, which indicates a history of actions of a specified character (e.g., user's operation target) among the plurality of characters (e.g., player characters 62).

The specified player character 62 is a player character 62 that is one of the plurality of player characters 62 and serves as a reference to determine actions of the other player characters 62. In other words, the specified player character 62 is a player character 62 whose action history is referred to when the actions of the player characters 62 are determined.

For example, the user's operation target or a player character 62 in possession of the ball 66 is selected as the specified player character 62. In the following, "specified player character 62" may be replaced with "user's operation target" or "character in possession of a moving object (e.g., ball 66)." In this embodiment, a case is explained where, when the user's operation target is in possession of the ball 66, the user's operation target is selected as a specified player character 62.

The action history data indicates a history of recent actions of the specified player character 62. The recent action history includes the current action of the specified player character 62 and/or one or more actions performed by the specified player character 62 before the current action. In other words, the action history data is a list indicating a history of actions from the past to the present. For example, the action history includes a history starting from a predetermined time up to the present time (e.g., 10 seconds before until the present time). Alternately, the action history includes a history of actions when the specified player character 62 performs the actions in order, starting from a point of time when an action is performed to the present time (when the specified player character 62 performs x number of actions (where x is an integer and x≥2) in order, starting from a point in time when y preceding actions (where y is an integer and x≥y≥2) are performed to the present time).

FIG. 5 illustrates an example of data storage of the action history data. As shown in FIG. 5, for example, the actions performed by the specified player character 62 are stored in the action history data on a time-series basis. In "action number" shown in FIG. 5, integers from 1 to n (where n is an integer and n≥2) are stored in ascending order. In this embodiment, an action having a smaller action number is performed at a time closer to the present time.

As shown in FIG. 5, action identification information for identifying the action of the specified player character 62 is stored in association with the action number. This embodiment explains a case where the action identification information indicates a type of action performed by the specified player character 62. For example, information for identifying any of the actions that the player character 62 can perform during a game is stored as the action identification information. For example, a plurality of action types may be defined in advance. The player character 62 performs any of the plurality of action types. That is, the action identification information is data indicative of any of the plurality of action types.

In the action history data shown in FIG. 5, for example, an action having an action number k (1≤k≤n) is the k-th nearest to the present time among the actions performed by the specified player character 62.

For example, in an example of the data storage shown in FIG. 5, the user's operation target is dribbling a ball toward the touchline 56 at present. The last action performed before the currently-performed action indicates that the user's operation target dribbled the ball to the goal 60 associated with the opponent team. The second previous action indicates that the user's operation target dribbled the ball toward the touchline 56. The third previous action indicates that the user's operation target stopped dribbling while the user's operation target was in possession of the ball 66.

As mentioned above, in this embodiment, the action history data is also data indicative of a combination of types of current and past actions (identification information indicative of types of actions) of the specified character. A combination of actions stored in the action history data is combinations and permutations, which are arranged on a time-series basis (e.g., chronological order or reverse chronological order).

[Action Information]

For example, the game data storage unit 80 stores an action history condition, which relates to any one of a combination of a current action and one or more previous actions of the specified character (e.g., user's operation target) and a combination of a plurality of previous actions of the specified character, in association with action information, which relates to actions that a plurality of characters other than the specified character should perform.

The action history condition is, for example, a condition indicative of whether or not a history of the recent actions of the specified player character 62 is a predetermined history. For example, the action history condition is a condition indicative of whether or not a combination of types of actions performed by the specified player character 62 is a predetermined combination.

FIG. 6 is an example showing associations between the action history condition and the action information. As shown in FIG. 6, the action information indicates actions of the player character 62 that acts based on the computer operation. For example, the action information indicates any of the actions that the player character 62 can perform, that is, any of a plurality of action types defined in the game. In other words, it is defined in the associations shown in FIG. 6 how the other player characters 62 act in accordance with the respective recent actions of the specified player character 62.

A control unit 14 functions as means for obtaining data stored in the game data storage unit 80. The control unit 14 also functions as means for updating data stored in the game data storage unit 80. The data stored in the game data storage unit 80 is not limited to the examples described above. For example, various parameters relating to the player character 62 (64) may be stored.

[1-3-2. Game Executing Unit]

The game executing unit 90 is implemented mainly by, for example, the control unit 14. The game executing unit 90 executes a game in which a plurality of player characters 62 (64) act. The game executing unit 90 controls respective actions of the player characters 62 (64) based on the operation by the user or by the computer. For example, the game executing unit 90 executes a game by updating the game situation data based on the actions performed by the player characters 62 (64).

The game executing unit 90 includes an action history writing unit 92, an action history condition determination unit 94, and an action control unit 96.

[Action History Condition Determination Unit]

During the game execution, the action history writing unit 92 writes action history data indicative of a history of actions performed by the specified character among a plurality of characters (e.g., player characters 62) into storing means (e.g., game data storage unit 80). As described above, in this embodiment, any of the plurality of action types prepared in advance is stored as the history of actions performed by the specified player character 62.

Figures 7, 8:
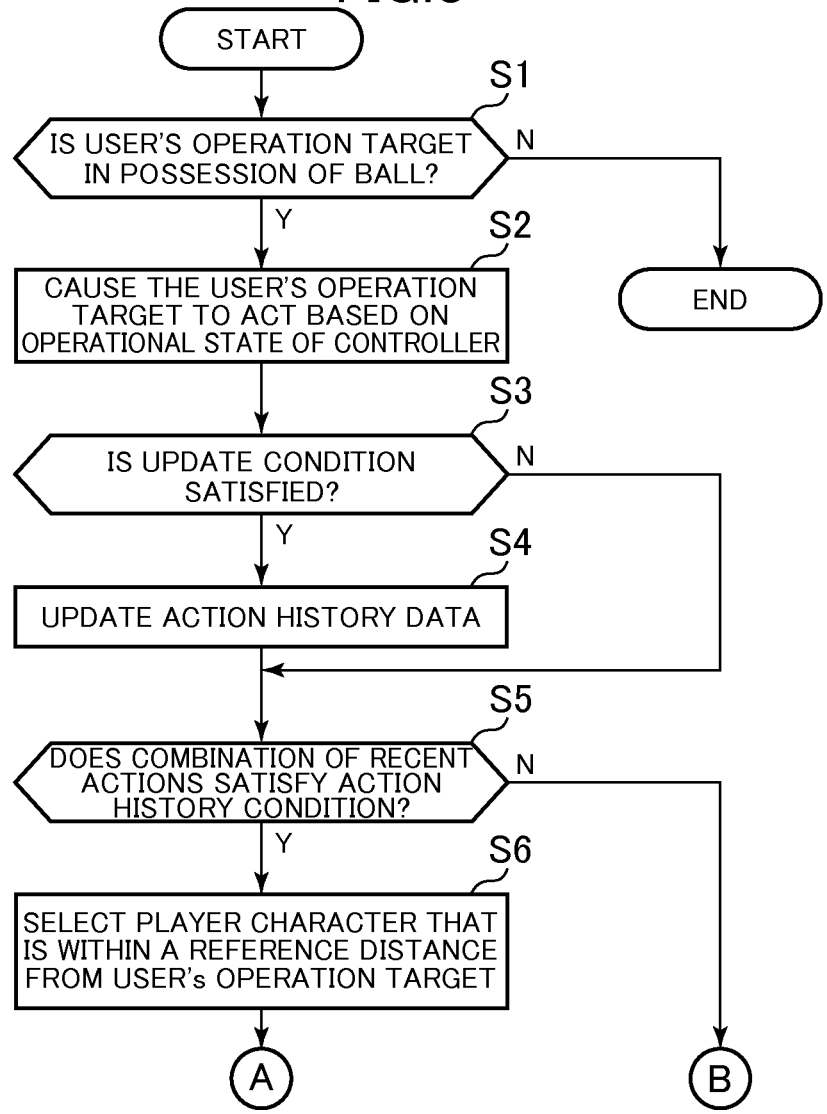
[FIG. 7] A diagram showing an example of action types.
[FIG. 8] A flow chart illustrating processing that the game device executes.

FIG. 7 illustrates an example of action types. As shown in FIG. 7, a condition relating to an action performed by the player characters 62 may be stored in association with information for identifying action types. For example, in a case where an action performed by the player character 62 satisfies the condition mentioned above, it is determined that the action of the action type associated with the condition is performed.

The action history writing unit 92 determines, by referring to associations shown in FIG. 7, whether or not the specified player character 62 performs an action belonging to any of the plurality of action types. In other words, it is determined whether or not the action performed by the specified player character 62 belongs to any of the plurality of action types. When it is determined that the specified player character 62 has performed an action belonging to any of the plurality of action types, identification information of the action type is stored in the action history data.

The action history writing unit 92 writes the action history data in a case where a given update condition is satisfied during the game execution. For example, when the update condition is satisfied, the action history data is updated based on the last action performed by the specified player character 62.

The update condition may be a condition determined for updating the action history data. For example, the update condition may be a condition indicative of whether or not a given update time arrives during the game execution, or a condition indicative of whether or not a type of an action performed by the specified player character 62 is changed. For example, it may be determined that the update condition is satisfied at a predetermined time interval, or at a time when a detection signal from the controller 30 changes.

When the action history data is updated while the game is being executed, for example, action identification information stored in a record having an action number k is shifted to a record having an action number k+1. Action identification information indicative of the current action of the player character 62 is stored in a record having an action number 1.

When the action history data is updated, an action stored in a record having an action number n (i.e., the oldest action) may be deleted. Further, when the specified player character 62 is switched to another player character (e.g., the user's operation target is switched to another player character or the user's operation target is not in possession of the ball 66), content of the action history data may be deleted temporarily.

[Action History Condition Determination Unit]

While a game is being executed, the action history condition determination unit 94 determines, based on the action history data, whether or not any one of a combination of a current action and one or more previous actions of the specified character (e.g., user's operation target) and a combination of a plurality of previous actions of the specified character satisfies the action history condition.

That is, it is determined whether or not any one of a combination of a current action and one or more previous actions of the specified character (e.g., user's operation target) and a combination of a plurality of previous actions of the specified character matches with a combination indicated by the action history condition.

For example, the action history condition determination unit 94 determines whether or not the action history condition is satisfied by comparing a combination of the actions indicated by the action history data with a combination of the actions indicated by the action history condition. In this embodiment, it is determined whether or not combinations and permutations of the actions indicated by the action history data are combinations and permutations of the actions indicated by the action history condition.

[Action Control Unit]

While the game is being executed and the action history condition is determined to be satisfied, the action control unit 96 causes the plurality of characters (e.g., player character 62) other than the specified character to act based on action information associated with the action history condition.

"The player characters 62 other than the specified player character 62" are at least one of the player characters 62 that are operated by the computer, and should act based on the action information.

The player characters 62 other than the specified player character 62 may be selected by determining whether or not a predetermined selection condition is satisfied. This embodiment explains a case where the action control unit 96 selects a player character 62 that should act according to the action information based on a positional relationship between the specified player character 62 and the other player characters 62. For example, the player character 62 that is within a reference distance from the specified player character 62 acts based on the action information shown in FIG. 6.

The game executing unit 90 may control the player characters 62 that are operated by the computer and not controlled by the action control unit 96 based on various behavior algorithms executed in known soccer games.

[1-4. Processing Executed in Game Device]

FIGS. 8 and 9 are flow charts illustrating processing that the game device 10 executes. FIGS. 8 and 9 illustrate processing that the game device 10 executes at predetermined intervals (e.g., every $\frac{1}{60}^{th}$ of a second). The control unit 14 executes processing shown in FIGS. 8 and 9 according to a program stored in an optical disc 36.

As shown in FIG. 8, the control unit 14 determines, by referring to the game situation data, whether or not the user's operation target is in possession of the ball 66 (S1). For example, it is determined whether or not data stored in the game situation data and indicative of the player character 62 (64) in possession of the ball 66 indicates the user's operation target. That is, in S1, it is determined whether or not the specified player character 62 has been selected in the game being executed.

In a case where the user's operation target is not in possession of the ball 66 (S1;N), this processing ends since there is no specified player character 62. In this case, the user's operation target acts according to an operational input by the user, and the player characters 62 (64) other than the user's operation target act based on a known behavior algorithm.

In a case where the user's operation target is in possession of the ball 66 (S1;Y), the control unit 14 obtains an operational state of the controller 30, and causes the user's operation target to act based on the operational state of the controller 30 (S2). For example, the operational state (detection signal) of the controller 30 and the action that the user's operation target should perform are stored in advance in association with each other. Then, by referring to the association, the action that the user's operation target should perform is determined.

The control unit 14 determines whether or not an update condition for updating the action history data is satisfied (S3).

For example, the control unit 14 determines whether or not a predetermined period of time has passed since the last time the action history data was updated, or whether or not a type of the action in S2 has changed from a type of the last action.

In a case where the update condition is satisfied (S3;Y), the control unit 14 specifies an action type of the specified player character 62 by comparing the action determined in S2 with data that defines the action types (FIG. 7), and updates the action history data (S4). Specifically, the control unit 14 copies action identification information having an action number k to a record of action number k+1. Subsequently, the control unit 14 stores the action identification information indicative of the action determined in S2 as the action identification information having an action number 1, thereby updating the action history data.

The control unit 14 determines, by referring to the action history data and the action history condition, whether or not a combination of the recent actions performed by the user's operation target satisfies the action history condition (S5). In S5, the control unit 14 determines whether or not the combinations and permutations of the actions performed by the user's operation target are the given combinations and permutations.

In a case where the history of actions performed by the user's operation target satisfies the action history condition (S5;Y), the control unit 14 selects, by referring to the game situation data, the player character 62 that is within a reference distance from the user's operation target among the player characters 62 operated by the computer (S6).

Referring to FIG. 9, the control unit 14 causes the player character 62 selected in S6 to act based on the action information associated with the action history condition that is determined to be satisfied in S5 (S7).

The control unit 14 causes the player characters 62 (64), which are operated by the computer and are other than the player character 62 selected in S6, to act based on the computer operation (S8). In S8, the actions may be determined according to a method based on a known behavior algorithm.

The control unit 14 updates the game situation data based on the action of the player characters 62 (64) (S9). The control unit 14 updates a display of the game screen 70 based on the updated game situation data (S10).

According to the game device 10 described above, in a case where the user's operation target is in possession of the ball 66, it is possible to differentiate the actions of the player characters 62 around the operation target in response to a combination of the recent actions of the operation target. That is, since the off-the-ball player characters 62 can act in association with the action of a player character in possession of a ball, it is possible to improve the controllability of the player characters 62.

For example, in a case where the user's operation target in possession of the ball dribbles a ball toward the goal 60 associated with the opponent team, and then dribbles the ball toward the touchline 56, it is conceivable that the user's operation target will perform a side attack, and the other player characters 62 (off-the-ball player characters) therefore act to perform a side attack.

On the other hand, in a case where the user's operation target in possession of the ball dribbles the ball toward the touchline 56, and then dribbles the ball toward another touchline 56, it is conceivable that the user's operation target is looking for a player character to pass the ball to, and the other player characters 62 (off-the-ball player characters) therefore act to receive the ball.

[2. Modifications]

The present invention is not to be limited to the above described embodiment and can be changed as appropriate without departing from the spirit of the invention.

(1) For example, this embodiment explains a case where the action control unit 96 controls the actions of the player characters 62 around the specified player character 62, but a method to select the player characters 62 controlled by the action control unit 96 is not limited to this embodiment. In addition, for example, the action control unit 96 may control the actions of the player character 62 selected based on a positional relationship between the player character 62 and the ball 66, or a position where the player character 62 stands on a pitch 59.

The action control unit 96 of modification (1) includes means for selecting, among the plurality of characters (e.g., player characters (62)) other than the specified character (e.g., operation target in possession of the ball (66)), a character that satisfies a selection condition relating to a position, and causes the character selected by the selecting means to act based on the action information associated with the action history condition.

The selection condition relating to a position is a condition relating to a position where the player character 62 stands on the game space 50. For example, the selection condition includes a condition indicative of whether or not a distance between the player character 62 and the player character 62 in possession of the ball 66 or the ball 66 is within a predetermined range, or a condition indicative of whether or not the position of the player character 62 is within a predetermined area of the game space 50.

The action control unit 96 determines whether or not the position of the player character 62 satisfies the selection condition by comparing the positions of the player characters 62 other than the specified player character 62 with the selection condition relating to a position.

According to the modification (1), it is possible to select the player character 62 that acts by the operation of the action control unit 96 according to the position of the player character 62. In this way, compared to a case where the action control unit 96 controls all of the player characters 62 on the game space 50, processing load of the game device 10 can be reduced because the action control unit 96 can select only the player characters 62 that are useful when performing the advanced action control.

(2) For example, the action control unit 96 may control the action of only the player character 62 in a specified position. For example, the action control unit 96 may control the player characters 62 in midfield and forward positions based on the action history of the specified player character 62, and control defender player characters 62 not based on the action history of the specified player character 62.

In the modification (2), each of the plurality of characters is given a role in a game. For example, a plurality of roles in a game are defined, and each of the player characters 62 is given any of the plurality of roles. The role in the game is a role that the player character 62 plays, such as positions of a soccer team (e.g., any of goalkeeper, defender, midfielder, and forward).

The action control unit 96 of modification (2) includes means for selecting, among the plurality of characters (e.g., player characters (62)) other than the specified character (e.g., the specified character 62), a character that satisfies a selection condition relating to a role in a game. The action control unit 96 causes the character selected by the selecting means to act based on the action information associated with the action history condition.

The selection condition relating to a role in a game is a condition indicative of whether or not the player character 62 plays a predetermined role. In the modification (2), the player character 62 that plays the predetermined role is selected.

According to the modification (2), it is possible to select the player character 62 that acts by the operation of the action control unit 96 according the position of the player character 62.

For example, compared to a case where the action control unit 96 controls all of the player characters 62 on the game space 50, processing load of the game device 10 can be reduced because the action control unit 96 operates only the player characters 62 that are in the predetermined position.

(3) For example, a player character 62 that is controlled by the action control unit 96 may be selected based on how good or bad the relationship (cooperation) between the player character 62 the specified player character 62 is. For example, the action control unit 96 may control only the player character 62 that acts based on the computer operation and has a good relationship (cooperation) with the specified player character 62.

The action control unit 96 of the modification (3) obtains a game parameter from means for storing game parameters in association with a combination of the plurality of characters. The game parameter is also a parameter that indicates how good or bad the relationship (cooperation) among the player characters 62 (64) is.

FIG. 10 shows an example of data storage of game parameters. As shown in FIG. 10, a game parameter is stored in association with a combination of information items (e.g., player ID) for identifying two player characters 62 (64). For example, the game parameter has a value from 0 to 100, and a higher value of the game parameter is associated with a better relationship (cooperation) between the two player characters 62 (64). In this regard, the game parameter may not be values shown in FIG. 10. For example, the game parameter may also be information indicative of how good or bad the relationship (cooperation) is. The information is indicated as, for example, one of the letters A to E, in which A indicates the best relation, and E indicates the worst relation.

The action control unit 96 includes means for selecting, among the plurality of characters (e.g., player characters 62 operated by the computer) other than the specified character (e.g., the specified character 62), a character that satisfies a selection condition relating to a game parameter associated with a combination with this character and the specified character. The action control unit 96 causes the character selected by the selecting means to act based on the action information associated with the action history condition.

The selection condition is a condition indicative of whether or not a value indicated by a game parameter is within a predetermined range (e.g., reference value or more). For example, the selection condition is a condition indicative of whether or not a degree of a relationship (cooperation) between the player characters 62 is within a predetermined range. The player character 62 that has a game parameter indicating a value within the predetermined range is selected.

According to the modification (3), it is possible to select a player character 62, which is operated by the action control unit 96 to act, based on how the player character 62 and the specified player character 62 relate (cooperate) with each other. In this way, compared to a case where the action control unit 96 controls all of the player characters 62 on the game space 50, processing load of the game device 10 can be reduced while increasing interest in the game because the action control unit 96 operates only some of the player characters 62.

(4) For example, the selection conditions described in the modifications (1) to (3) may be associated with the action information. For example, when a player character 62 performs a side attack, the player character 62 may be selected based on a selection condition relating to the roles, and when a player character 62 moves to receive a pass, the player character 62 may be selected based on a selection condition relating to the positions.

FIG. 11 shows an example of data storage of the action information of the modification (4). As shown in FIG. 11, the action information of the modification (4) is stored in association with the action history condition and the selection condition.

The selecting means of the action control unit 96 determines, when it is determined that the action history condition is satisfied in the game being executed, whether or not the selection condition associated with the action history condition is satisfied. The action control unit 96 causes the character selected by the selecting means to act based on the action information associated with the action history condition and the selection condition. That is, when both of the action history condition and the selection condition are satisfied, the player character 62 acts based on the action information associated with both conditions.

According to the modification (4), it is possible to differentiate methods for selecting a player character 62 to act according to the action indicated by the action information. As such, it is possible to select a player character 62 best suited for carrying out an action indicated by the action information and cause the player character 62 to perform the action.

The methods for selecting the player character 62 to act by the control of the action control unit 96 are not limited to the examples in the embodiment and the modifications (1) to (3). The player character 62 may be selected based on a predetermined method.

In addition, for example, a player character 62 may be selected based on a positional relationship between a position of the player character 62 and a position of a focal point of a virtual camera 68. The focal point of the virtual camera 68 corresponds to the center point of the game screen 70, and thus it is conceivable that the user is looking at the area around the focal point of the virtual camera 68. Accordingly, it is possible to select a player character 62 located around the position at which the user is likely to be looking, and to cause the selected player character 62 to act based on the action history of the specified player character 62.

(5) Although the foregoing describes a case where, for example, the specified player character 62 is the user's operation target in possession of the ball 66, the specified player character 62 may be other player characters 62. The specified player character 62 may be the user's operation target that is not in possession of the ball 66.

In addition, for example, the specified player character 62 may be, among the player characters 62 operated by the computer, a player character 62 in possession of the ball 66. Further, for example, the specified player character 62 may be a player character 62 within the predetermined area of the game space 50, or a player character 62 whose positional relationship with the player character 62 in possession of the ball 66 is a predetermined relationship. Alternatively, for example, the specified player character 62 may be a player character 62 that has a specific role.

(6) For example, the player character 62 that acts according to the action control of the action control unit 96 may not be a player character 62 selected by the selecting means. For example, all of the player characters 62 belonging to the same team may act according to the control of the action control unit 96, or only predetermined some of the plurality of player characters 62 may act according to the control of the action control unit 96.

For example, although the foregoing describes a case where the player characters 62 belonging to the same team are operated by the action control unit 96, the player characters 64 belonging to the opponent team may be operated by the control of the action control unit 96. In this case, the specified player character 62 may be any of the player characters 62 belonging to the opponent team.

(7) For example, although the foregoing describes a case where the game space 50 is a three-dimensional space as shown in FIG. 2, the game space according to the present invention may be a two-dimensional game space in which the positions or the like of the player character 62 (64) or the ball 66 are managed by the two coordinate elements.

(8) For example, the present invention can be applied to a game device that executes games other than the soccer game. The present invention can be applied to a game in which characters act. For example, the present invention can also be applied to a game device that executes a basketball game, an ice hockey game, or an American football game. In addition, for example, the present invention can be applied to a game device that executes a shooter game (e.g., FPS; First Person Shooting), an action game, or a role-playing game.

The invention claimed is:

1. A game device for executing a game in which each of a plurality of characters acts, the game device comprising:

action history writing means for writing, into storage means, during the game being executed, action history data indicative of a history of actions performed by a specified character among the plurality of characters;

obtaining means for obtaining action information regarding an action that should be performed by a character, among the plurality of characters other than the specified character, from storage means for storing the action information and an action history condition regarding any one of a combination of a current action of the specified character and one or more previous actions of the specified character and a combination of a plurality of previous actions of the specified character, the action history condition and the action information being stored in association with each other;

action history condition determination means for determining, in the game being executed, based on the action history data, whether or not any one of the combination of the current action of the specified character and one or more previous actions of the specified character and the combination of the plurality of previous actions of the specified character satisfy the action history condition; and action control means for controlling the game device to cause, in the game being executed, in a case where it is determined that the action history condition is satisfied, the character, among the plurality of characters other than the specified character, to act based on the action information associated with the action history condition.

2. The game device according to claim 1, wherein the action history data indicates a history of actions performed by a user's operation target among the plurality of characters, wherein the action history condition is a condition relating to any one of a combination of a current action of the user's operation target and one or more previous actions of the user's operation target and a combination of a plurality of previous actions of the user's operation target, and wherein the action history condition determination means determines, in the game being executed, based on the action history data, whether or not any one of the combination of the current action of the user's operation target and one or more previous actions of the user's operation target and the combination of the plurality of previous actions of the user's operation target satisfies the action history condition.

3. The game device according to claim 1, wherein the game device executes a game using a moving object, wherein the action history data indicates a history of actions performed by, among the plurality of characters, the character in possession of the moving object, wherein the action history condition is a condition relating to any one of a combination of a current action of the character in possession of the moving object and one or more previous actions of the character in possession of the moving object and a combination of a plurality of previous actions of the character in possession of the moving object, and wherein the action history condition determination means determines, in the game being executed, based on the action history data, whether or not any one of the combination of the current action of the character in possession of the moving object and one or more previous actions of the character in possession of the moving object and the combination of the plurality of previous actions of the character in possession of the moving object satisfies the action history condition.

4. The game device according to claim 1,
wherein the action control means comprises selecting means for selecting, among the plurality of characters other than the specified character, a character that satisfies a selection condition relating to a position, and controls the game device to cause the character selected by the selecting means to act based on the action information associated with the action history condition.

5. The game device according to claim 1,
wherein each of the plurality of characters has a role in the game, and
wherein the action control means comprises selecting means for selecting, among the plurality of characters other than the specified character, a character that satisfies a selection condition relating to a role in the game, and controls the game device to cause the character selected by the selecting means to act based on the action information associated with the action history condition.

6. The game device according to claim 1,
wherein the action control means comprises:
means for obtaining, from means for storing a game parameter in association with a combination of the plurality of characters, the game parameter; and
selecting means for selecting, among the plurality of characters other than the specified character, a character that satisfies a selection condition relating to the game parameter associated with a combination with this character and the specified character,
wherein the action control means controls the game device to cause the character selected by the selecting means to act based on the action information associated with the action history condition.

7. The game device according to claim 4,
wherein the action information is stored in association with the action history condition and the selection condition,
wherein the selecting means determines, in the game being executed, in a case where it is determined that the action history condition is satisfied, whether or not the selection condition associated with the action history condition is satisfied, and
wherein the action control means controls the game device to cause the character selected by the selecting means to act based on the action information associated with the action history condition and the —selection condition.

8. A method for controlling a game device for executing a game in which each of a plurality of characters acts, the method comprising the steps of:
writing, into a storage, during the game being executed, action history data indicative of a history of actions performed by a specified character among the plurality of characters;
obtaining, by at least one microprocessor, action information regarding an action that should be performed by a character, among the plurality of characters other than the specified character, from the storage that stores the action information and an action history condition regarding any one of a combination of a current action of the specified character and one or more previous actions of the specified character, and a combination of a plurality of previous actions of the specified character, the action history condition and the action information being stored in association with each other;
determining, by at least one microprocessor in the game being executed, based on the action history data, whether or not any one of the combination of the current action of the specified character and one or more previous actions of the specified character, and the combination of the plurality of previous actions of the specified character satisfy the action history condition; and
controlling the game device to cause, by at least one microprocessor in the game being executed, in a case where it is determined that the action history condition is satisfied, the character, among the plurality of characters other than the specified character, to act based on the action information associated with the action history condition.

9. A non-transitory computer readable information storage medium for storing a program for causing a processor to function as a game device for executing a game in which each of a plurality of characters acts, the program further causing the processor to:
write, into a storage, during the game being executed by the processor, action history data indicative of a history of actions performed by a specified character among the plurality of characters;
obtain action information regarding an action that should be performed by the character, among the plurality of characters other than the specified character, from the storage that stores the action information and an action history condition regarding any one of a combination of a current action of the specified character and one or more previous actions of the specified character, and a combination of a plurality of previous actions of the specified character, the action history condition and the action information being stored in association with each other;
determining, during the game being executed by the processor, based on the action history data, whether or not any one of the combination of the current action of the specified character and one or more previous actions of the specified character and the combination of the plurality of previous actions of the specified character satisfy the action history condition; and
controlling, in the game being executed by the processor, in a case where it is determined that the action history condition is satisfied, the character, among the plurality of characters other than the specified character, to act based on the action information associated with the action history condition.

10. A game device for executing a game in which each of a plurality of characters acts, the game device comprising:
a storage; and
at least one microprocessor configured to:
write, into the storage, during the game being executed, action history data indicative of a history of actions performed by a specified character among the plurality of characters;
read action information regarding an action that should be performed by a character, among the plurality of characters other than the specified character, from the storage that stores the action information and an action history condition regarding any one of a combination of a current action of the specified character and one or more previous actions of the specified character, and a combination of a plurality of previous actions of the specified character, the action history condition and the action information being stored in association with each other;

determine, during the game being executed, based on the action history data, whether or not any one of the combination of the current action of the specified character and one or more previous actions of the specified character, and the combination of the plurality of previous actions of the specified character satisfy the action history condition; and control the game device to cause, in the game being executed, when it is determined that the action history condition is satisfied, the character, among the plurality of characters other than the specified character, to act based on the action information associated with the action history condition.

\* \* \* \* \*